United States Patent Office 3,316,259
Patented Apr. 25, 1967

3,316,259
4-OXO-5 TERTIARY AMINO METHYL-4,5,6,7-TETRAHYDRO BENZO(b) THIOPHENES
Joseph Sam, Oxford, Miss. 38655
No Drawing. Filed Nov. 16, 1964, Ser. No. 411,584
7 Claims. (Cl. 260—247.1)

This invention relates to novel compounds. More particularly, this invention relates to novel compounds having hypotensive activity.

There is provided according to the present invention compounds of the formula (I)
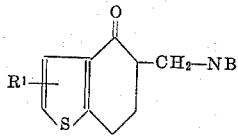

wherein $R^1$ is a member selected from the group consisting of hydrogen, chloro, bromo, fluoro, iodo, trifluoromethyl, nitro, (lower)alkyl, allyl, and radicals of the formula II)
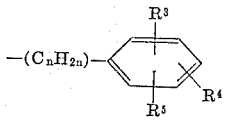

wherein $n$ is a whole integer from 0 to 3 inclusive, $R^3$, $R^4$ and $R^5$ are each a member selected from the group consisting of hydrogen, chloro, bromo, iodo, fluoro, trifluoromethyl, nitro, (lower)alkyl, (lower)alkoxy, (lower)alkylthio, allyl and di(lower)alkylamino, and wherein NB is a primary or secondary amino radical; and the pharmaceutically acceptable nontoxic acid addition salts thereof.

The term "(lower)alkyl" as used herein means both straight and branched chain aliphatic hydrocarbon radicals having from 1 to 10 carbon atoms such as methyl, ethyl, propyl, isopropyl, butyl, isobutyl, t-butyl, amyl, hexyl, 2-ethylhexyl, heptyl, decyl, etc. Similarly, where the term "(lower)" is used as part of the description of another group, e.g., "(lower)alkoxy," it refers to the alkyl portion of such group which is therefore as described above in connection with (lower)alkyl.

The term "primary amino radical" as used herein refers to a radical obtained by removing one hydrogen atom attached to the nitrogen atom of a primary amine and thus comprises radicals of the formula —NHR² wherein $R^2$ is selected from the group consisting of hydrogen, (lower)alkyl, cycloalkyl having from 5 to 7 carbon atoms inclusive, and radicals of the formula (III)
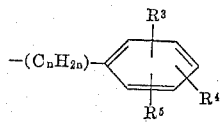

wherein $n$ is a whole integer from 0 to 3 inclusive, and $R^3$, $R^4$ and $R^5$ each represent a member selected from the group consisting of hydrogen, (lower)alkyl, (lower)alkoxy, allyl, chloro, bromo, fluoro, iodo, nitro, trifluoromethyl, di(lower)alkylamino and (lower)alkylthio. The term "primary amino radicals" therefore includes, for example, such radicals as amino, methylamino, ethylamino, propylamino, isopropylamino, hexylamino, cyclopentylamino, cyclohexylamino, cycloheptylamino, phenylamino, benzylamino and the like.

The term "secondary amino radical" refers to a radical obtained by removing one hydrogen atom attached to the nitrogen atom of a secondary amine, and thus comprises radicals from the group consisting of morpholino, (lower)alkylmorpholino, di(lower)alkylmorpholino, piperidino, (lower)alkylpiperidino, di(lower)alkylpiperidino, pyrrolidino, (lower)alkylpyrrolidino, di(lower)alkylpyrrolidino, N-(lower)alkylpiperazino, N-(lower)alkyl-(lower)alkylpiperazino, N-(lower)alkyl-di(lower)alkylpiperazino, and radicals of the formula

wherein $R^6$ and $R^7$ are selected from the group consisting of (lower)alkyl, cycloalkyl having from 5 to 7 carbon atoms inclusive and radicals of the formula (IV)
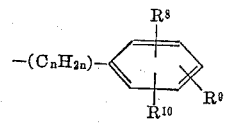

wherein $n$ is a whole integer from 0 to 3 inclusive, and $R^8$, $R^9$ and $R^{10}$ each represent a member selected from the group consisting of hydrogen, (lower)alkyl, (lower)alkoxy, allyl, chloro, bromo, fluoro, iodo, nitro, trifluoromethyl, di(lower)alkylamino and (lower)alkylthio. The term "secondary amino radicals" therefore includes for example, such radicals as dimethylamino, diethylamino, dipropylamino, di-n-butylamino, diisoamylamino, dibenzylamino, diphenylamino, dicyclopentylamino, dicyclohexylamino, dicycloheptylamino, methylanilino, methylethylamino, α-, β- and γ-pipecolino, morpholino, piperidino, 2,6-dimethylmorpholino, N-methylpiperazino, N-methylbenzylamino, pyrrolidino, 2,6-dimethylpiperidino, N-methyl-n-butylamino, N-ethylcyclohexylamino and the like.

The pharmaceutically acceptable nontoxic salts of the foregoing bases include the organic and inorganic acid addition salts prepared by simple addition of one equivalent of acid to the base. These salts include those prepared from acids such as hydrochloric, sulfuric, sulfamic, tartaric, hydrobromic, hydriodic, glycolic, citric, maleic, phosphoric, succinic, acetic, and the like.

The compounds of this invention produce a potent and prolonged blood pressure lowering effect which makes them useful in the treatment of hypertension.

Tests of the compounds of the present invention for hypotensive activity were carried out in rats. When, for example, 4-keto-5-dimethylaminomethyl-4,5,6,7-tetrahydrothionaphthene hydrochloride and 4-keto-5-morpholinomethyl - 4,5,6,7 - tetrahydrothionaphthene hydrochloride were administered orally in rats at dosages of 100 mgm./kg. a reduction in arterial blood pressure was obtained of greater than 10%.

The compounds of the present invention can be compounded and formulated into pharmaceutical preparations for oral, parenteral or topical administration with organic or inorganic solid materials or liquids that are pharmaceutically acceptable carriers. The compositions may take the form of tablets, effervescent tablets, powders, granules, capsules (both hard and soft shell capsules), suspensions, solutions, emulsions, injectable solutions and suspensions, and the like. Such compositions are considered within the scope of this invention.

A preferred group of compounds of Formula I are those of the formula (V)
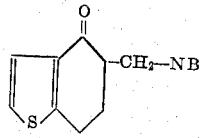

wherein NB is as represented above. A more preferred group of compounds are those of the formula (VI) 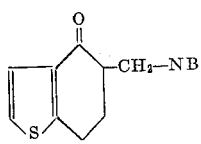

wherein NB is a secondary amino radical.

The compounds of the present invention are prepared in general according to the procedures described below or those described in Chapter 10, the Mannich Reaction, Organic Reactions, vol. 1, pp. 303-341 (1942), Wiley and Sons, New York, New York, and by E. M. Fry, Journal of Organic Chemistry, vol. 10 (1945), p. 259.

In the synthesis of the aminomethyl 4-keto-4,5,6,7-tetrahydrothionaphthenes of Formula I, a 4-keto-4,5,6,7-tetrahydrothionaphthene of the formula (VII) 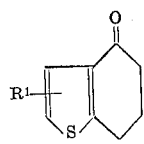

wherein R¹ is as described above, is reacted, as illustrated by Example 1, below, with formaldehyde or paraformaldehyde and a primary or secondary amine of the formula (VIII)        HNB wherein NB is as represented above, to produce the compounds of the formula (IX) 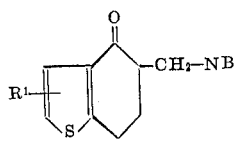

wherein R¹ and NB are as described above. The reaction is conveniently carried out in the presence of a solvent such as ethanol and at reflux temperature. The reactants, in general, are present in about equal molar amounts.

The starting materials used in the process described herein are compounds which are either commercially available, well-known in the art, or easily prepared in accordance with standard organic procedures previously described in the chemical literature. The preparation of 4-keto-4,5,6,7-tetrahydrothionaphthene is described by Fieser et al., Journal of the American Chemical Society, vol. 57 (1935), p. 1611.

The compositions of this invention when administered orally or parenterally in an effective amount are effective in the treatment of hypertension.

The following examples are intended to illustrate the invention described herein without unduly restricting it.

EXAMPLE 1

Preparation of 4-keto-5-methylaminomethyl-4,5,6,7-tetrahydrothionaphthene hydrochloride

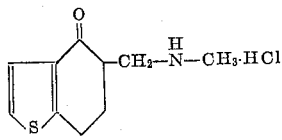

A mixture of 1.52 gm. (0.01 mol) of 4-keto-4,5,6,7-tetrahydrothionaphthene, 0.375 gm. (0.0125 mol) of paraformaldehyde, 0.743 gm. (0.011 mol) of methylamine hydrochloride, 10 ml. of absolute ethanol, and one drop of concentrated hydrochloric acid was refluxed on a steam bath for 4 hours. The alcohol was removed in vacuo and the residual solid was washed several times with ether leaving 1.7 gm. of product, 4-keto-5-methylaminomethyl-4,5,6,7-tetrahydrothionaphthene hydrochloride, which was recrystallized from absolute ethanol, and found to have a melting point of 205-206° C. and to have the following elemental analysis:

Analysis.—Calc'd for $C_{10}H_{14}ClNOS$: C, 51.83; H, 6.09; Cl, 15.31; N, 6.05; S, 13.84. Found: C, 51.97; H, 6.13; Cl, 15.24; N, 5.98; S, 13.74.

EXAMPLE 2

Preparation of 4-keto-5-dimethylaminomethyl-4,5,6,7-tetrahydrothionaphthene hydrochloride

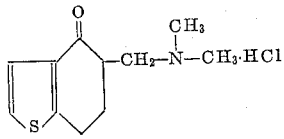

A mixture of 3.04 gm. (0.02 mol) of 4-keto-4,5,6,7-tetrahydrothionaphthene, 0.751 gm. (0.025 mol) of paraformaldehyde, 1.794 gm. (0.022 mol) of dimethylamine hydrochloride, 10 ml. of absolute ethanol, and one drop of concentrated hydrochloric acid was refluxed on a steam bath for 4 hours. The alcohol was removed in vacuo and the residual solid was washed several times with ehter, leaving 3.4 gm. of product, 4-keto-5-dimethylaminomethyl-4,5,6,7-tetrahydrothionaphthene hydrochloride, which, after recrystallization several times from absolute ethanol, was found to have a melting point of 186-188° C., and to have the following elemental analysis.

Analysis.—Calc'd for $C_{11}H_{16}ClNOS$: C, 53.74; H, 6.56; Cl, 14.42; N, 5.70; S, 13.04. Found: C, 53.70; H, 6.47; Cl, 14.38; N, 5.67; S, 12.86.

EXAMPLE 3

Preparation of 4-keto-5-morpholinomethyl-4,5,6,7-tetrahydrothionaphthene hydrochloride

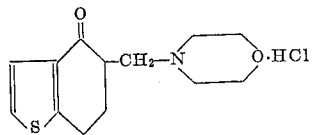

A mixture of 2.0 gm. (0.0131 mol) of 4-keto-4,5,6,7-tetrahydrothionaphthene, 0.495 gm. (0.0165 mol) of paraformaldehyde, 1.788 gm. (0.0145 mol) of morpholine hydrochloride, 10 ml. of absolute ethanol, and one drop of concentrated hydrochloric acid was refluxed on a steam bath for 4 hours. The alcohol was removed in vacuo and the residual solid was washed several times with ether, leaving 3.0 gm. of product, 4-keto-5-morpholinomethyl - 4,5,6,7 - tetrahydrothionaphthene hydrochloride, which was recrystallized from absolute ethanol, was found to have a melting point of 184-186° C., and to have the following elemental analysis.

Analysis.—Calc'd for $C_{13}H_{18}ClNO_2S$: C, 54.24; H, 6.30; Cl, 12.32; N, 4.87; S, 11.14. Found: C, 54.12; H, 6.28; Cl, 12.27; N, 4.94; S, 11.04.

EXAMPLE 4

Preparation of 4-keto-5-piperidinomethyl-4,5,6,7-tetrahydrothionaphthene hydrochloride

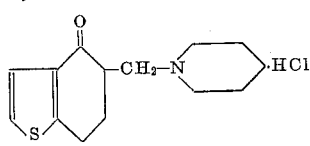

A mixture of 3.04 gm. (0.02 mol) of 4-keto-4,5,6,7-tetrahydrothionaphthene, 0.75 gm. (0.025 mol) of paraformaldehyde, 2.44 gm. (0.022 mol) of piperidine hydrochloride, 15 ml. of absolute ethanol, and two drops of concentrated hydrochloric acid was refluxed on a steam bath for 4 hours. The alcohol was removed in vacuo and the residual solid was washed several times with ether leaving 3.0 gm. of the product, 4-keto-5-piperidinomethyl-4,5,6,7-tetrahydrothionaphthene hydrochloride, which was

EXAMPLE 5

Preparation of 4-keto-5-benzylaminomethyl-4,5,6,7-tetrahydrothionaphthene hydrochloride

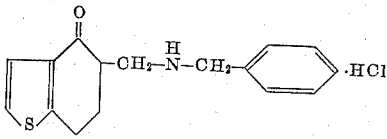

A mixture of 1.52 gm. (0.01 mol) of 4-keto-4,5,6,7-tetrahydrothionaphthene, 0.375 gm. (0.0125 mol) of paraformaldehyde, 1.58 gm. (0.011 mol) of benzylamine hydrochloride, 10 ml. of absolute ethanol, and one drop of concentrated hydrochloric acid was refluxed on a steam bath for 4 hours. The alcohol was removed in vacuo and the residual solid was washed several times with ether leaving 1.5 gm. of the product, 4-keto-5-benzylaminomethyl-4,5,6,7-tetrahydrothionaphthene, which was recrystallized from absolute ethanol, was found to have a melting point of 172–174° C., and to have the following elemental analysis.

Analysis.—Calc'd for $C_{16}H_{18}ClNOS$: C, 62.44; H, 5.89; N, 4.55; S, 10.42. Found: C, 61.63; H, 5.81; N, 4.65; S, 10.53.

EXAMPLE 6

In the procedure of Example 1, the methylamine hydrochloride is replaced by an equal molar amount of ammonia, ethylamine, propylamine, butylamine, octylamine, cyclopentylamine, cyclohexylamine, phenylamine, 3-chlorophenylamine, 2-methylphenylamine, 3,4-dimethoxyphenylamine, 2-iodophenylamine, 4-trifluoromethylphenylamine, 2-bromophenylamine, 2,3,4-trichlorophenylamine, 4-fluorophenylamine, 4-allylphenylamine, 2-nitrophenylamine, 2,3-dimethylphenylamine, 2,4-dichlorophenylamine, 2-methylthiophenylamine, 4-diethylaminophenylamine, 2-chlorobenzylamine, 2,4-dibromophenylamine, 2,3-dichlorobenzylamine, 2-methoxybenzylamine and phenethylamine, to produce the following compounds, 4-keto-5-aminomethyl-4,5,6,7-tetrahydrothionaphthene,
4-keto-5-ethylaminomethyl-4,5,6,7-tetrahydrothionaphthene,
4-keto-5-propylaminomethyl-4,5,6,7-tetrahydrothionaphthene,
4-keto-5-butylaminomethyl-4,5,6,7-tetrahydrothionaphthene,
4-keto-5-octylaminomethyl-4,5,6,7-tetrahydrothionaphthene,
4-keto-5-cyclopentylaminomethyl-4,5,6,7-tetrahydrothionaphthene,
4-keto-5-cyclohexylaminomethyl-4,5,6,7-tetrahydrothionaphthene,
4-keto-5-phenylaminomethyl-4,5,6,7-tetrahydrothionaphthene,
4-keto-5-(3-chlorophenylaminomethyl)-4,5,6,7-tetrahydrothionaphthene,
4-keto-5-(2-methylphenylaminomethyl)-4,5,6,7-tetrahydrothionaphthene,
4-keto-5-(3,4-dimethoxyphenylaminomethyl)-4,5,6,7-tetrahydrothionaphthene,
4-keto-5-(2-iodophenylaminomethyl)-4,5,6,7-tetrahydrothionaphthene,
4-keto-5-(4-trifluoromethylphenylaminomethyl)-4,5,6,7-tetrahydrothionaphthene,
4-keto-5-(2-bromophenylaminomethyl)-4,5,6,7-tetrahydrothionaphthene,
4-keto-5-(2,3,4-trichlorophenylaminomethyl)-4,5,6,7-tetrahydrothionaphthene,
4-keto-5-(4-fluorophenylaminomethyl)-4,5,6,7-tetrahydrothionaphthene,
4-keto-5-(4-allylphenylaminomethyl)-4,5,6,7-tetrahydrothionaphthene,
4-keto-5-(2-nitrophenylaminomethyl)-4,5,6,7-tetrahydrothionaphthene,
4-keto-5-(2,3-dimethylphenylaminomethyl)-4,5,6,7-tetrahydrothionaphthene,
4-keto-5-(2,4-dichlorophenylaminomethyl)-4,5,6,7-tetrahydrothionaphthene,
4-keto-5-(2-methylthiophenylaminomethyl)-4,5,6,7-tetrahydrothionaphthene,
4-keto-5-(4-diethylaminophenylaminomethyl)-4,5,6,7-tetrahydrothionaphthene,
4-keto-5-(2-chlorobenzylaminomethyl)-4,5,6,7-tetrahydrothionaphthene,
4-keto-5-(2,4-dibromophenylaminomethyl)-4,5,6,7-tetrahydrothionaphthene,
4-keto-5-(2,3-dichlorobenzylaminomethyl)-4,5,6,7-tetrahydrothionaphthene,
4-keto-5-(2-methoxybenzylaminomethyl)-4,5,6,7-tetrahydrothionaphthene, and
4-keto-5-phenethylaminomethyl-4,5,6,7-tetrahydrothionaphthene, respectively.

EXAMPLE 7

In the procedure of Example 1, the methylamine hydrochloride is replaced by an equal molar amount of diethylamine, diheptylamine, dicyclohexylamine, N-methylethylamine, diphenylamine, N-methylbenzylamine, N-ethyl-4-methylphenylamine, N-methyl-3-chlorophenylamine, dipropylamine, N-ethylpiperazine, N-methyl-3,4-dimethoxyphenylamine, N-methyl-2,6-diethylpiperazine, pyrrolidine, pipecoline, 2-methylmorpholine, di-2,3,4-trichlorophenylamine, N-ethyl-2,4-dimethoxyphenylamine, N-methyl-4-allyl phenylamine, dibenzylamine, N-methyl-2-bromophenylamine, N-methyl-4-trifluoromethylphenylamine and di-3-methylthiophenylamine, to produce the following compounds, 4-keto-5-diethylaminomethyl-4,5,6,7-tetrahydrothionaphthene,
4-keto-5-diheptylaminomethyl-4,5,6,7-tetrahydrothionaphthene,
4-keto-5-dicyclohexylaminomethyl-4,5,6,7-tetrahydrothionaphthene,
4-keto-5-(N-methylethylaminomethyl)-4,5,6,7-tetrahydrothionaphthene,
4-keto-5-diphenylaminomethyl-4,5,6,7-tetrahydrothionaphthene,
4-keto-5-(N-methylbenzylaminomethyl)-4,5,6,7-tetrahydrothionaphthene,
4-keto-5-(N-ethyl-4-methylphenylaminomethyl)-4,5,6,7-tetrahydrothionaphthene,
4-keto-5-(N-methyl-3-chlorophenylaminomethyl)-4,5,6,7-tetrahydrothionaphthene,
4-keto-5-dipropylaminomethyl-4,5,6,7-tetrahydrothionaphthene,
4-keto-5-(N-ethylpiperazinomethyl)-4,5,6,7-tetrahydrothionaphthene,
4-keto-5-(N-methyl-3,4-dimethoxyphenylaminomethyl)-4,5,6,7-tetrahydrothionaphthene,
4-keto-5-(N-methyl-2,6-diethylpiperazinomethyl)-4,5,6,7-tetrahydrothionaphthene,
4-keta-5-pyrrolidinomethyl-4,5,6,7-tetrahydrothionaphthene,
4-keto-5-pipecolinomethyl-4,5,6,7-tetrahydrothionaphthene,
4-keto-5-(2-methylmorpholinomethyl)-4,5,6,7-tetrahydrothionaphthene,
4-keto-5-(di-2,3,4-trichlorophenylaminomethyl)-4,5,6,7-tetrahydrothionaphthene,
4-keto-5-(N-ethyl-2,4-dimethoxyphenylaminomethyl)-4,5,6,7-tetrahydrothionaphthene, 4-keto-5-(N-methyl-4-allylphenylaminomethyl)-4,5,6,7-tetrahydrothionaphthene,
4-keto-5-dibenzylaminomethyl-4,5,6,7-tetrahydrothionaphthene,
4-keto-5-(N-methyl-2-bromophenylaminomethyl)-4,5,6,7-tetrahydrothionaphthene,
4-keto-5-(N-methyl-4-trifluoromethylphenylaminomethyl)-4,5,6,7-tetrahydrothionaphthene and
4-keto-5-(di-3-methylthiophenylaminomethyl)-4,5,6,7-tetrahydrothionaphthene, respectively.

EXAMPLE 8

In the procedure of Example 1, the 4-keto-4,5,6,7-tetrahydrothionaphthene is replaced by an equal molar amount of 2-bromo-4-keto-4,5,6,7-tetrahydrothionaphthene,
3-methyl-4-keto-4,5,6,7-tetrahydrothionaphthene,
2-trifluoromethyl-4-keto-4,5,6,7-tetrahydrothionaphthene,
2-nitro-4-keto-4,5,6,7-tetrahydrothionaphthene,
3-chloro-4-keto-4,5,6,7-tetrahydrothionaphthene,
3-isopropyl-4-keto-4,5,6,7-tetrahydrothionaphthene,
3-phenyl-4-keto-4,5,6,7-tetrahydrothionaphthene,
2-fluoro-4-keto-4,5,6,7-tetrahydrothionaphthene,
3-(2-chlorophenyl)-4-keto-4,5,6,7-tetrahydrothionaphthene,
3-benzyl-4-keto-4,5,6,7-tetrahydrothionaphthene,
3-(4-methylbenzyl)-4-keto-4,5,6,7-tetrahydrothionaphthene,
2-(3,6-dimethylphenyl)-4-keto-4,5,6,7-tetrahydrothionaphthene,
3-(2,5-dichlorophenyl)-4-keto-4,5,6,7-tetrahydrothionaphthene,
2-allyl-4-keto-4,5,6,7-tetrahydrothionaphthene,
2-(4-methoxyphenyl)-4-keto-4,5,6,7-tetrahydrothionaphthene,
2-(2,3,4-trichlorophenyl)-4-keto-4,5,6,7-tetrahydrothionaphthene,
3-(2,4,5-trifluorobenzyl)-4-keto-4,5,6,7-tetrahydrothionaphthene,
2-(2-nitrophenyl)-4-keto-4,5,6,7-tetrahydrothionaphthene,
3-(2,5-dibromophenyl)-4-keto-4,5,6,7-tetrahydrothionaphthene,
3-(4-chlorophenyl)-4-keto-4,5,6,7-tetrahydrothionaphthene,
3-(4-allylphenyl)-4-keto-4,5,6,7-tetrahydrothionaphthene,
3-(2-dimethylaminophenyl)-4-keto-4,5,6,7-tetrahydrothionaphthene,
2-(2-fluoro-4-trifluoromethylphenyl)-4-keto-4,5,6,7-tetrahydrothionaphthene,
3-(4-iodophenyl)-4-keto-4,5,6,7-tetrahydrothionaphthene and
2-(4-ethylthiobenzyl)-4-keto-4,5,6,7-tetrahydrothionaphthene, respectively, to produce the following compounds, 2-bromo-4-keto-5-methylaminomethyl-4,5,6,7-tetrahydrothionaphthene,
3-methyl-4-keto-5-methylaminomethyl-4,5,6,7-tetrahydrothionaphthene,
2-trifluoromethyl-4-keto-5-methylaminomethyl-4,5,6,7-tetrahydrothionaphthene,
2-nitro-4-keto-5-methylaminomethyl-4,5,6,7-tetrahydrothionaphthene,
3-chloro-4-keto-5-methylaminomethyl-4,5,6,7-tetrahydrothionaphthene,
3-isopropyl-4-keto-5-methylaminomethyl-4,5,6,7-tetrahydrothionaphthene,
3-phenyl-4-keto-5-methylaminomethyl-4,5,6,7-tetrahydrothionaphthene,
2-fluoro-4-keto-5-methylaminomethyl-4,5,6,7-tetrahydrothionaphthene,
3-(2-chlorophenyl)-4-keto-5-methylaminomethyl-4,5,6,7-tetrahydrothionaphthene,
3-benzyl-4-keto-5-methylaminomethyl-4,5,6,7-tetrahydrothionaphthene,
3-(4-methylbenzyl)-4-keto-5-methylaminomethyl-4,5,6,7-tetrahydrothionaphthene,
2-(3-dimethylphenyl)-4-keto-5-methylaminomethyl-4,5,6,7-tetrahydrothionaphthene,
3-(2,5-dichlorophenyl)-4-keto-5-methylaminomethyl-4,5,6,7-tetrahydrothionaphthene,
2-allyl-4-keto-5-methylaminomethyl-4,5,6,7-tetrahydrothionaphthene,
2-(4-methoxyphenyl)-4-keto-5-methylaminomethyl-4,5,6,7-tetrahydrothionaphthene,
2-(2,3,4-trichlorophenyl)-4-keto-5-methylaminomethyl-4,5,6,7-tetrahydrothionaphthene,
3-(2,4,5-trifluorobenzyl)-4-keto-5-methylaminomethyl-4,5,6,7-tetrahydrothionaphthene,
2-(2-nitrophenyl)-4-keto-5-methylaminomethyl-4,5,6,7-tetrahydrothionaphthene,
3-(2,5-dibromophenyl)-4-keto-5-methylaminomethyl-4,5,6,7-tetrahydrothionaphthene,
3-(4-chlorophenyl)-4-keto-5-methylaminomethyl-4,5,6,7-tetrahydrothionaphthene,
3-(4-allylphenyl)-4-keto-5-methylaminomethyl-4,5,6,7-tetrahydrothionaphthene,
3-(2-dimethylaminophenyl)-4-keto-5-methylaminomethyl-4,5,6,7-tetrahydrothionaphthene,
2-(2-fluoro-4-trifluoromethylphenyl)-4-keto-5-methylaminomethyl-4,5,6,7-tetrahydrothionaphthene,
3-(4-iodophenyl)-4-keto-5-methylaminomethyl-4,5,6,7-tetrahydrothionaphthene and
2-(4-ethylthiobenzyl)-4-keto-5-methylaminomethyl-4,5,6,7-tetrahydrothionaphthene, respectively.

Example 9

In the procedure of Example 1, 4-keto-4,5,6,7-tetrahydrothionaphthene and methylamine hydrochloride are replaced by 3-ethyl-4-keto-4,5,6,7-tetrahydrothionaphthene and propylamine,
2-chloro-4-keto-4,5,6,7-tetrahydrothionaphthene and diethylamine,
3-(3-methylphenyl)-4-keto-4,5,6,7-tetrahydrothionaphthene and phenylamine,
2-(4-trifluoromethylbenzyl)-4-keto-4,5,6,7-tetrahydrothionaphthene and cyclohexylamine,
2-methyl-4-keto-4,5,6,7-tretrahydrothionaphthene and N-methylpiperazine,
3-trifluoromethyl-4-keto-4,5,6,7-tetrahydrothionaphthene and diphenylamine, and
3-phenyl-4-keto-4,5,6,7-tetrahydrothionaphthene and N-ethylpropylamine, to produce the following compounds, 3-ethyl-4-keto-5-propylaminomethyl-4,5,6,7-tetrahydrothionaphthene,
2-chloro-4-keto-5-dimethylaminomethyl-4,5,6,7-tetrahydrothionaphthene,
3-(3-methylphenyl)-4-keto-5-phenylaminomethyl-4,5,6,7-tetrahydrothionaphthene,
2-(4-trifluoromethylbenzyl)-4-keto-5-cyclohexylaminomethyl-4,5,6,7-tetrahydrothionaphthene,
2-methyl-4-keto-5-(N-methylpiperazinomethyl)-4,5,6,7-tetrahydrothionaphthene,
3-trifluoromethyl-4-keto-5-diphenylaminomethyl-4,5,6,7-tetrahydrothionaphthene and
3-phenyl-4-keto-5-(N-ethylpropylaminomethyl)-4,5,6,7-tetrahydrothionaphthene, respectively.

While this invention has been described and exemplified in terms of its preferred embodiment, those skilled in the art will appreciate that modifications can be made without departing from the spirit and scope of this invention.

What is claimed is:

1. A compound selected from the group consisting of compounds of the formula

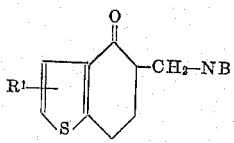

wherein R¹ is a member selected from the group consisting of hydrogen, chloro, bromo, fluoro, iodo, trifluoromethyl, nitro, (lower)alkyl, allyl, and radicals of the formula

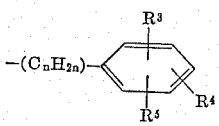

wherein $n$ is a whole integer from 0 to 3 inclusive, $R^3$, $R^4$ and $R^5$ are each a member selected from the group consisting of hydrogen, chloro, bromo, iodo, fluoro, trifluoromethyl, nitro (lower)alkyl, (lower)alkoxy, (lower)alkylthio, allyl and di(lower)alkylamino, and wherein NB is an amino radical having the formula —NHR² wherein R² is a member selected from the group consisting of hydrogen, (lower)alkyl, cycloalkyl having from 5 to 7 carbon atoms inclusive, and radicals of the formula

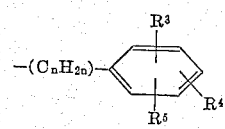

wherein $n$, $R^3$, $R^4$ and $R^5$ are as defined above, or an amino radical selected from the group consisting of morpholino, (lower)alkylmorpholino, di(lower)alkylmorpholino, piperidino, (lower)alkylpiperidino, di(lower)alkylpiperidino, pyrrolidino, (lower)alkylpyrrolidino, di(lower)alkylpyrrolidino, N-(lower)alkylpiperazino, N-(lower)alkyl(lower)alkylpiperazino, N-(lower)alkyl-di(lower)alkylpiperazino, and radicals of the formula

wherein R⁶ and R⁷ are selected from the group consisting of (lower)alkyl, cycloalkyl having from 5 to 7 carbon atoms inclusive and radicals of the formula

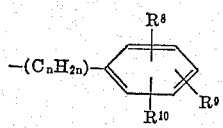

wherein $n$ is a whole integer from 0 to 3 inclusive, and $R^8$, $R^9$ and $R^{10}$ each represent a member selected from the group consisting of hydrogen, (lower)alkyl, (lower)alkoxy, allyl, chloro, bromo, fluoro, iodo, nitro, trifluoromethyl, di(lower)alkylamino and (lower)alkylthio; and the pharmaceutically acceptable nontoxic acid addition salts thereof.

2. A compound selected from the group consisting of compounds of the formula

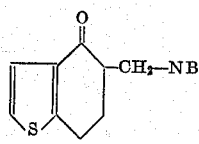

wherein NB is an amino radical having the formula —NHR² wherein R² is a member selected from the group consisting of hydrogen, (lower)alkyl, cycloalkyl having from 5 to 7 carbon atoms inclusive, and radicals of the formula

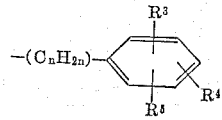

wherein, $n$, $R^3$, $R^4$ and $R^5$ are as defined above, or an amino radical selected from the group consisting of morpholino, (lower)alkylmorpholino, di(lower)alkylmorpholino, piperidino, (lower)alkylpiperidino, di(lower)alkylpiperidino, pyrrolidino, (lower)alkylpyrrolidino, di(lower)alkylpyrrolidino, N-(lower)alkylpiperazino, N-(lower)alkyl(lower)alkylpiperazino, N-(lower)alkyl-di(lower)alkylpiperazino, and radicals of the formula

wherein R⁶ and R⁷ are selected from the group consisting of (lower)alkyl, cycloalkyl having from 5 to 7 carbon atoms inclusive and radicals of the formula

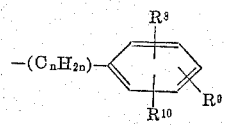

wherein $n$ is a whole integer from 0 to 3 inclusive, and $R^8$, $R^9$ and $R^{10}$ each represent a member selected from the group consisting of hydrogen, (lower)alkyl, (lower)alkoxy, allyl, chloro, bromo, fluoro, iodo, nitro, trifluoromethyl, di(lower)alkylamino and (lower)alkylthio; and the pharmaceutically acceptable nontoxic acid addition salts thereof.

3. The compound having the formula

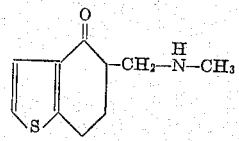

4. The compound having the formula

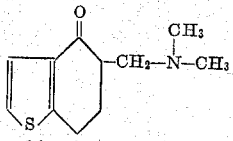

5. The compound having the formula

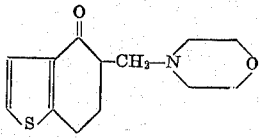

6. The compound having the formula

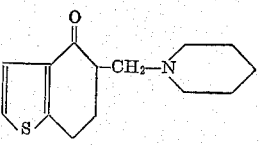

7. The compound having the formula

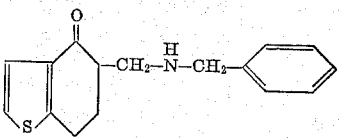

References Cited by the Applicant

Fieser et al., J. Am. Chem. Soc.; 57, 1611 (1935).

ALEX MAZEL, *Primary Examiner.*

J. TOVAR, *Assistant Examiner.*